March 8, 1938.    F. L. FREEMAN    2,110,330
OPHTHALMIC INSTRUMENT
Filed Nov. 18, 1935
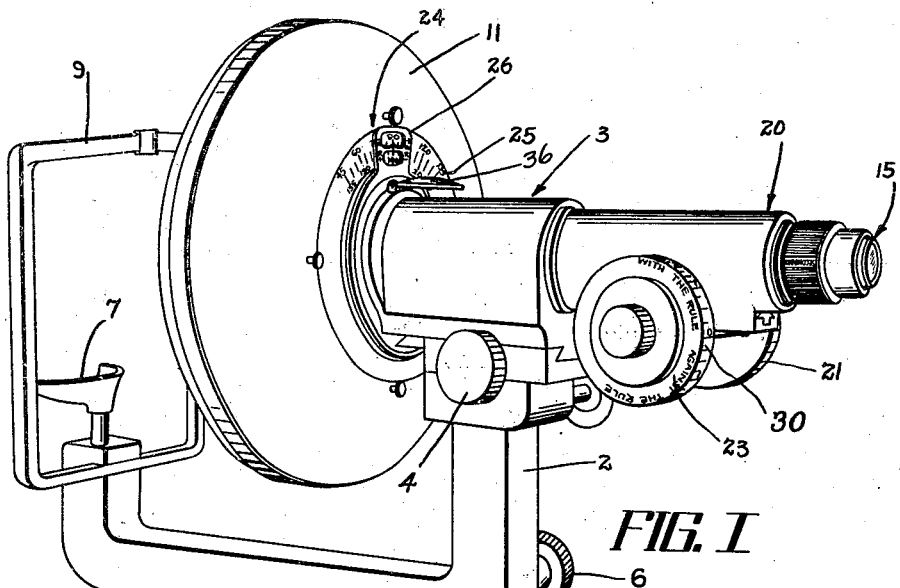
FIG. I
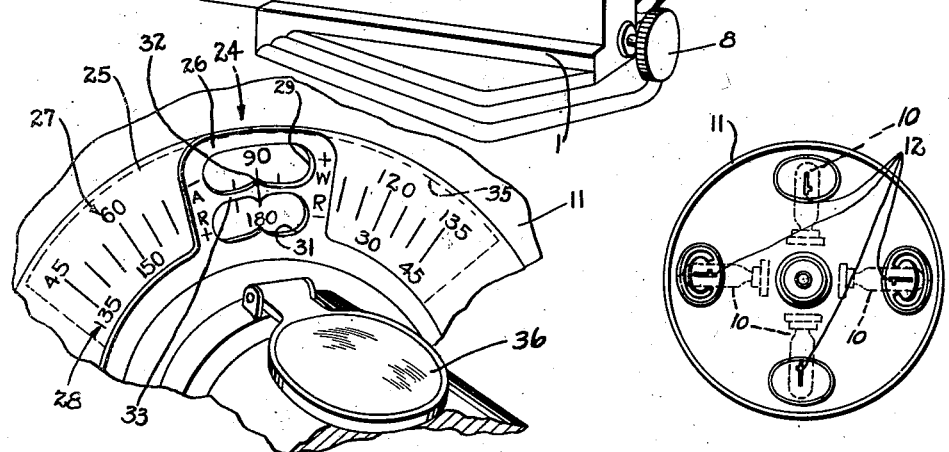
FIG. II    FIG. III
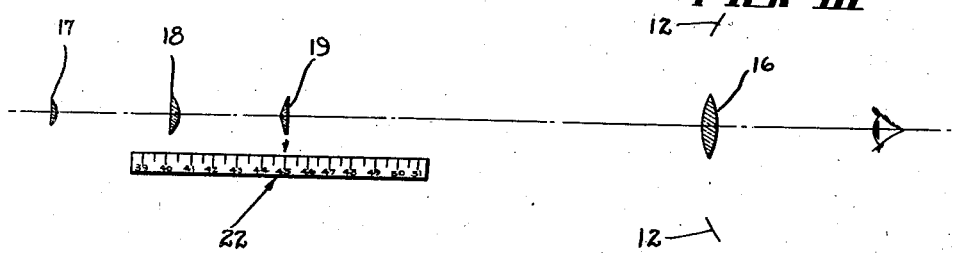
FIG. IV
INVENTOR
FADOR L. FREEMAN
BY
Harry H. Styll
ATTORNEY Patented Mar. 8, 1938

2,110,330

UNITED STATES PATENT OFFICE 2,110,330

OPHTHALMIC INSTRUMENT

Fador L. Freeman, Chicago, Ill., assignor to American Optical Company, Southbridge, Mass., a voluntary association of Massachusetts Application November 18, 1935, Serial No. 50,394

2 Claims. (Cl. 88—20)

This invention relates to ophthalmic instruments and is more particularly concerned with an improved instrument commercially known as an ophthalmometer, provided with convenient and useful means for indicating the prescription of a lens to compensate for abnormal conditions of a patient's eyes.

In testing and prescribing astigmatic corrections for eyes, the error may be corrected by prescribing plus cylinders or minus cylinders, so long as the axis and relative values of the corrections in the different meridians are proper.

It is general practice for some refractionists to prescribe plus cylinders while others prefer to prescribe minus cylinders. For that reason the commercial ophthalmometers are provided with two scales, one designated "With the Rule" and the other "Against the Rule", abbreviated "WR" and "AR" for indicating the powers of the cylinders.

The terms "With the Rule" and "Against the Rule" have acquired a very definite meaning in the ophthalmic trade from a long period of usage. Since it is usual, when there is a difference in characteristics between the meridians of the eye, that the horizontal meridian is of greatest radius, or less refractive power, than the vertical, this condition is known and expressed as the "rule". Cases in which the astigmatism conforms to this usual rule are termed "With the Rule" and cases in which the astigmatism is opposite to the rule are termed "Against the Rule".

The prescriptions designated in accordance with these scales vary in axis by 90 degrees and one would have a plus sign and the other the negative sign. It is absolutely essential that the proper sign and axis be properly designated or the finished lens will not fit the patient. Although these prior devices have means for indicating the powers "Against the Rule" or "With the Rule", there was no provision for indicating the axis of the powers. Such prior devices have had a degree scale having graduations throughout a full circle and separate pointers at right angles to each other. With such devices, the person operating the instrument must constantly carry in his mind which pointer indicates the proper axis when the lenses are prescribed "Against the Rule" or "With the Rule" and it is readily apparent that an error in the prescription is quite possible.

Accordingly, one of the prime objects of this invention is to provide an improved device or means for indicating unmistakably the axis of astigmatism "With the Rule" or "Against the Rule".

Another object is to provide an improved device for indicating directly the prescriptive characteristics of a lens to compensate for the difference in conditions of the eye in different meridians.

Another object is to provide an improved device for determining the variations in the curvature of the cornea of the eye in the different meridians and for simultaneously indicating same in terms of a lens prescribed according to either of the two common procedures of prescribing "With the Rule" or "Against the Rule" for cases of astigmatism.

Another object is to provide improved means for indicating the axis with or against the rule which extends over a very small portion of the dial.

A further object is to provide an improved device for quickly determining the astigmatic correction required to compensate for the error in an eye.

Other objects and advantages of the invention will become apparent from the following description taken in connection with the accompanying drawing, and it will be apparent that many changes may be made in the details of construction, arrangement of parts, method shown and described without departing from the spirit of the invention as expressed in the accompanying claims. I, therefore, do not wish to be limited to the exact details and steps of the method shown and described, as the preferred forms only have been shown in the way of illustration.

Referring to the drawing in which:

Fig. I is a perspective view of the device embodying the invention;

Fig. II is an enlarged partial perspective view of the scale and indicator means for indicating the axis and type of cylindrical correction necessary to compensate for differences in conditions of the eyes in the different meridians of the eye, Fig. III is a view of the patient's side of the test objects; and Fig. IV is a schematic view of the optical system of the invention.

Broadly, this invention relates to a novel indicator means for translation of the indications of an ophthalmic instrument into prescriptive terminology so that the readings may be taken directly with much less liability of mistake.

The apparatus of this invention is particularly adapted to be used with an apparatus shown and described in United States Patent No. 1,046,105, dated December 3, 1912, and for that reason no detailed description will be given. The apparatus will be very generally described in order to facilitate the understanding of the present invention.

Referring to the drawing in which similar reference numerals refer to similar parts throughout the several views, the instrument is mounted on a stand for securing its proper positioning with relation to the eye of the patient, which comprises a suitable base 1, having a suitable upright column 2, having a carriage 3 slidably mounted thereon, and having means 4 for moving the carriage transversely relative to the column 2. The column also has means 6 for adjusting the vertical position of the carriage 3. A suitable chin rest 7, adapted to be raised or lowered by means of a hand control 8, and a head rest 9 are provided for positioning a person's head and eyes before the instrument for testing the eyes.

The instrument proper has a concave drum-like member 11 having a plurality, preferably four, mires or illuminated test objects 12, spaced symmetrically with respect to the axis of rotation of member 11, see Fig. III, arranged with two each in two meridians at right angles to each other. The mires are preferably provided with lamp means 10 for illuminating same. The mires 12 preferably comprise openings in one side of the drum-like member 11. These openings may be covered with translucent material or left open. In either event, the outline of the openings is clearly shown by the illuminating means 10 inside the member 11. The member 11 is mounted for rotational, as well as longitudinal, movement in the carriage 3. The longitudinal movement is provided so that the mires can be moved toward or away from the person's eyes in order that the image of the mires on the eye may be brought to a focus on the eye piece 15 of the instrument.

As will later appear in connection with the description of the optical system of the instrument, the curvature of the cornea of the eye in the different meridians may be measured by determining the refractive power necessary to bring the spaced images of the mires 12 in a predetermined superimposed relation.

Referring to Fig. IV, the optical system of the apparatus includes a double convex lens 16 carried by disc member 11, which also carries the mires 12, an eyepiece 15 having two lenses 17 and 18 and a double refracting prism 19 adapted to move independently, rotatably and longitudinally of the axis of the instrument by means of a hand wheel 21, which operates a rack and pinion (not shown) associated with a telescopic tube 20 carrying the prism 19 and eyepiece 15. Suitable calibrated scale and indicator means, schematically shown at 22 in Fig. IV, are associated with the wheel 21 and calibrated to indicate the refractive curvature of the anterior surface of the cornea. For convenience, a second wheel 23 carried with a small amount of friction by the same shaft that carries the wheel 21, indicates the difference between successive movements of the wheel 21. The prism 19 is adapted to be rotated through an angle of 90 degrees so that the characteristics of the eye may be measured in different meridians. The angle of the meridian of measurement is determined by means of the scale and indicator means 24, which preferably comprises a translucent plate 25 carrying degree divisions, fixed on the member 11 over an arcuate slot 35 in the member 11, and an indicator 26 having a mark thereon which cooperates with the degree indications to readily indicate the axis of the cylindrical correction necessary to compensate for the difference in the conditions of the eye in the different meridians. The illuminating means 10 inside the member 11 causes the plate 25 and its degree indications to be clearly illuminated. If desired a suitable magnifying lens 36 may be adjustably mounted for positioning the same before the indicator means 24 to facilitate reading the latter. The scale indications preferably extend over only an arc of 90 degrees. The plate 25 carries two series of degree indications 27 and 28, the former running from 45 to 135 in a clockwise direction and the latter marked from 135 to 180 and from 0 to 45 in a clockwise direction. It will be noted that the zero or normal position of the member 11 is at 90 and 180 of the respective scales.

Since it is usual when there is a difference in characteristics between different meridians of the eye that the horizontal meridian is of greatest radius or less refractive power than the vertical, this condition is known and expressed as the "rule".

Unlike visual conditions of the eye in different meridians are usually compensated for by a lens having different refractive powers in different meridians and this can be accomplished by using either plus or minus cylinder with or without spherical lens surfaces. It will be apparent, however, that the axis of a plus cylinder would be displaced 90 degrees from the position of the axis a minus cylinder to produce the same astigmatic correction and vice versa. It follows also that "Against the Rule" astigmatism would be corrected by cylinders having their axes placed 90 degrees from the position the axes would occupy if they were to correct "With the Rule" astigmatism.

Some practitioners prefer to prescribe for either with or against the rule astigmatism using minus cylinders, while others almost invariably prefer the use of plus cylinders. In the past the person refracting the eyes had to keep these confusing rules in his mind and, consequently, there was a danger of writing down the wrong sign or axis for the prescription and causing added expense in checking the prescription and/or having a new lens made.

To greatly facilitate the operation and to reduce the possibility of making errors in prescribing lenses, the indicator means is so made as to indicate the axis and the sign of the correction to correct the astigmatism. To this end, the indicator is marked "With the Rule" and "Against the Rule", the two common ways in prescribing lenses.

As will be seen from Fig. II, the indicator means comprises a fan shaped extension 26 held by a ring member fixed to the carriage 3. The extension 26 has two openings 29 and 31, which are adapted to lie over the upper and lower degree scales 27 and 28, respectively, carried on plate 25. A mark 32 positioned on a web 33 dividing the two openings is adapted to be aligned with the divisions of the degree scales 27 and 28.

On the left hand side of the openings 29 and 31 the markings "A" and "R" are arranged in vertical alignment with a minus sign above the "A" and opposite the opening 29 and a plus sign below the "R" opposite the opening 31. On the right hand side of the openings 29 and 31 the markings "W" and "R" are arranged in vertical alignment with a plus sign above the "W" opposite the opening 29 and a minus sign under the "R" and opposite the opening 31. If a person desires to prescribe minus cylinders for "Against the Rule" astigmatism, the axis is read by observing the number of the degree marking appearing in the opening 29 which is aligned with the mark 32. The axis would be the same for a plus cylinder for "With the Rule" astigmatism. If it is desired to prescribe plus cylinders for "Against the Rule" astigmatism, the axis is read by observing the number of the degree marking appearing in the opening 31 aligned with the mark 32. The axis would be the same for minus cylinders for "With the Rule" astigmatism.

In the operation of the apparatus described and to carry out the objects of the invention, a patient's head is placed against the head rest 9 and the chin rest 7 is adjusted for comfort of the patient. The height of the instrument is adjusted so that the axis of the instrument is aligned with the line of straight ahead vision of the patient. Assuming that the prism 19 is turned to the primary position, the carriage 3 is moved toward or away from the patient until the images of two of the mires 12 on the eye in one meridian are brought to a sharp focus in the eyepiece 15. The right hand wheel 21 is then manipulated to move the prism 19 longitudinally and the member 11 is rotated until images of the mires 12 are brought into superimposed relation to determine the meridian of maximum or minimum curvature. The prism 19 is then rotated 90 degrees with respect to its first or primary position. If the anterior surface of the cornea of the eye is a perfect sphere, the other mires 12 in the meridian at right angles to the first will be aligned in the meridian at right angles to the first without adjustment of the hand wheel 21. If the images of the mires are displaced laterally of each other it will indicate that the member 11 carrying the mires 12 must be rotated one way or the other to align the images of the mires with the other major axis of the cornea, while if the images are displaced longitudinally of each other, the prism 19 must be moved toward or away from the eye until the images are superimposed. The angular rotation of the member 11 is indicated by the scale and indicator means 24. When the hand wheel 21 is first manipulated to superimpose the images when the prism 19 is in the primary position, the hand wheel 23 is set at zero and then the difference in the curvature will be indicated on the scale 30 carried by the wheel 23 when the wheel 21 is manipulated to superimpose the images with the prism 19 in the secondary position. If desired, the scale 30 on the wheel 23 may be calibrated in dioptric values. Since in prescribing lenses for correcting astigmatism, a lens curvature for correcting a selected meridian must be determined first to serve as a basis for determining the position and curvature in the other major meridian, the selection of the first meridian automatically determines the axis and kind of curvature for the other meridian. It is common practice to measure the curvature of the cornea in the meridian nearest the horizontal first and then measure the other major meridian. When this procedure is followed it is termed "With the Rule". Likewise, if the vertical meridian is measured first it is termed "Against the Rule". In order to indicate to the refractionist unmistakably which way to prescribe, that is, "Against the Rule" or "With the Rule", the hand wheel 23 has inscribed thereon on one side of zero "Against the Rule" and on the other side "With the Rule". Since the handwheel 23 will indicate whether there is with or against the rule astigmatism, the meridian of the astigmatic correction will be determined by the scale and indicator means 24.

When the refractionist has completed an examination of the anterior surface of the cornea by the apparatus described the dioptric power, axis of the cylinder, for either a plus or minus cylinder will be unmistakably indicated on the instrument. Since the scale is concentrated into one-quarter of the full arc, reading is greatly facilitated.

From the foregoing description it is apparent that by this invention I have provided a novel device for measuring the cornea of the eye and by which the possibility of incorrectly prescribing is greatly reduced.

Having described my invention, I claim:

1. In an eye testing instrument, the combination of a base having a support rotatable thereon, said support having means for producing test images on the cornea of the eye under test and movable with said support to align said test images in the meridian of astigmatism, an optical system movable into focus for viewing said images on the cornea, optical means for shifting the positions of said images toward and away from each other along said meridian of astigmatism in one position and along a meridian at 90° relative to said meridian of astigmatism in another position to locate the said images in desired aligned relation with each other in each of said meridians, scale and indicator means associated with said last mentioned optical means for determining the differences of the curvatures in the two meridians to obtain the amount of astigmatism "With" or "Against the Rule", and scale means and indicator means associated with said base and rotatable support with one of said means carried by said base and the other by said support, said scale means comprising mutual divisions having two separate degree indications for said divisions differing by a value of 90° and said indicator means having opposed aligned reference members, said scale means and reference members being movable relative to each other when the support is rotated in the base during the aligning of the test images in the above mentioned meridians and each of said reference members functioning cooperatively with the respective degree indications, one of said reference members having a minus "Against the Rule" indication and a plus "With the Rule" indication and the other having a plus "Against the Rule" indication and a minus "With the Rule" indication which indicate which of the respective reference members and degree indications is to be read to determine the true axis of a plus or minus lens that is to be made "With" or "Against the Rule" as indicated by the optical means for determining the amount of astigmatism.

2. In an eye testing instrument, the combination of a base having a support rotatable thereon, said support having means for producing test images on the cornea of the eye under test and movable with said support to align said test images in the meridian of astigmatism, an optical system movable into focus for viewing said images on the cornea, optical means for shifting the positions of said images toward and away from each other along said meridian of astigmatism in one position and along a meridian at 90° relative to said meridian of astigmatism in another position to locate the said images in desired aligned relation with each other in each of said meridians, scale and indicator means associated with said last mentioned optical means for determining the differences of the curvatures in the two meridians to obtain the amount of astigmatism "With" or "Against the Rule", and scale means and indicator means associated with said base and rotatable support with one of said means carried by said base and the other by said support, said scale means being substantially concentric with the center of rotation of the support and comprising spaced degree lines having two separate degree indications adjacent the opposite ends of said lines differing by a value of 90° for each respective line and said indicator means having spaced openings with a reference member in each of said openings, said scale means and reference members being movable relative to each other when the support is rotated in the base during the aligning of the test images in the above mentioned meridians, each of said reference members functioning cooperatively with the respective degree indications, one of said reference members having a minus "Against the Rule" indication and a plus "With the Rule" indication and the other having a plus "Against the Rule" indication and a minus "With the Rule" indication which indicate which of the respective reference members and degree indications is to be read to determine the true axis of a plus or minus lens that is to be made "With" or "Against the Rule" as indicated by the optical means for determining the amount of astigmatism.

FADOR L. FREEMAN.